(12) United States Patent
Jiang

(10) Patent No.: US 11,226,084 B2
(45) Date of Patent: Jan. 18, 2022

(54) STAGE LIGHT WITH ADDITIONAL VISUAL EFFECT

(71) Applicant: Guangzhou Haoyang Electronic Co., Ltd., Guangdong (CN)

(72) Inventor: Weikai Jiang, Guangdong (CN)

(73) Assignee: Guangzhou Haoyang Electronic Co., Ltd.

( * ) Notice: Subject to any disclaimer, the term of this patent is extended or adjusted under 35 U.S.C. 154(b) by 0 days.

(21) Appl. No.: 17/041,079

(22) PCT Filed: Aug. 20, 2020

(86) PCT No.: PCT/CN2020/110157
§ 371 (c)(1),
(2) Date: Sep. 24, 2020

(87) PCT Pub. No.: WO2021/147309
PCT Pub. Date: Jul. 29, 2021

(65) Prior Publication Data
US 2021/0222855 A1    Jul. 22, 2021

(30) Foreign Application Priority Data

Jan. 21, 2020 (CN) .......................... 202010071967.4

(51) Int. Cl.
*F21V 14/06* (2006.01)
*F21V 8/00* (2006.01)
(Continued)

(52) U.S. Cl.
CPC ............ *F21V 14/06* (2013.01); *G02B 6/0033* (2013.01); *G02B 6/0078* (2013.01);
(Continued)

(58) Field of Classification Search
CPC ..... F21V 14/06; G02B 6/0078; G02B 6/0033; G02B 6/0068; G02B 6/0073;
(Continued)

(56) References Cited

U.S. PATENT DOCUMENTS

| | | | |
|---|---|---|---|
| 2003/0017823 A1* | 1/2003 | Mager ............... | H04M 1/72427 455/414.1 |
| 2008/0123364 A1* | 5/2008 | Chang ................. | G02B 6/0016 362/608 |

(Continued)

*Primary Examiner* — Rajarshi Chakraborty
*Assistant Examiner* — Glenn D Zimmerman
(74) *Attorney, Agent, or Firm* — Lerner, David, Littenberg, Krumholz & Mentlik, LLP

(57) ABSTRACT

A stage light with an additional visual effect includes a main light source and a lampshade, the main light source being located at a bottom of the lampshade. The stage light further includes at least one effect light source and at least one light-transmitting plate located at a light outlet of the lampshade. The effect light source and the main light source are controlled independently of each other. The light-transmitting plate has a first surface and a second surface, and a first side and a second side connecting to the first surface and the second surface, respectively. At least part of the light emitted by the effect light source enters from the first side and exits from the second side. The light emitting by the effect light source exits from the second side, so that the second side is illuminated, which decorates the stage light itself.

17 Claims, 4 Drawing Sheets

(51) Int. Cl.
 *F21Y 113/10* (2016.01)
 *F21W 131/406* (2006.01)
 *F21Y 115/10* (2016.01)
(52) U.S. Cl.
 CPC .... *F21W 2131/406* (2013.01); *F21Y 2113/10* (2016.08); *F21Y 2115/10* (2016.08)
(58) Field of Classification Search
 CPC .............. F21Y 2115/10; F21Y 2113/10; F21Y 2105/18; F21Y 2107/10; F21Y 2107/30; F21Y 2113/00; F21W 2131/406; F21S 10/00
 See application file for complete search history.

(56) References Cited

U.S. PATENT DOCUMENTS

| | | | | |
|---|---|---|---|---|
| 2009/0316436 | A1* | 12/2009 | Takahashi | G07F 17/3202 362/628 |
| 2010/0204841 | A1* | 8/2010 | Chemel | H05B 45/20 700/282 |
| 2011/0204841 | A9* | 8/2011 | MacDonald | H01M 8/227 320/101 |
| 2013/0169908 | A1* | 7/2013 | Iwamoto | G02F 1/133707 349/96 |
| 2013/0322076 | A1* | 12/2013 | Parker | G02B 6/0085 362/240 |
| 2014/0293191 | A1* | 10/2014 | Momose | G02B 6/0078 349/65 |
| 2015/0159817 | A1* | 6/2015 | Olsson | H01L 33/58 362/294 |

* cited by examiner

STAGE LIGHT WITH ADDITIONAL VISUAL EFFECT

CROSS REFERENCE TO RELATED APPLICATIONS

The present application is a national phase entry under 35 U.S.C. § 371 of International Application No. PCT/CN2020/110157, filed Aug. 20, 2020, which claims priority from Chinese Patent Application No. 202010071967.4, filed Jan. 21, 2020, the disclosures of which are incorporated by reference herein.

TECHNICAL FIELD

The present invention relates to the technical field of stage lighting, and more particularly, to a stage light with an additional visual effect.

BACKGROUND

In the technical field of stage lighting, the traditional stage light creates gorgeous light effect generally through the combination of a main light source and effect components such as a gobo wheel or a color wheel, and various light effects are projected at a target position. When the main light source is off, the stage light itself will not have any decorative effect, which looks relatively monotonous and cannot attract attention from audiences.

SUMMARY OF THE INVENTION

A purpose of the present invention is to overcome at least one of the above-mentioned defects in the prior art, to provide a stage light with an additional visual effect. On the premise of not increasing a volume of the stage light, an effect light source is set for the light-transmitting plate, thereby adding an additional lighting effect without affecting a light effect of a light path.

In order to realize the above purpose, the technical solution adopted by the present invention is as follows. A stage light with an additional visual effect includes a main light source and a lampshade, the main light source being located at a bottom of the lampshade. The stage light further includes at least one effect light source and at least one light-transmitting plate which are located at a light outlet of the lampshade. The effect light source and the main light source are controlled independently of each other. The light-transmitting plate has a first surface and a second surface, and a first side and a second side connecting the first surface and the second surface, respectively. At least part of the light emitted by the effect light source enters from the first side and exits from the second side.

At least part of the light emitted by the effect light source enters from the first side and exits from the second side, so that the second side is illuminated, which decorates the stage light itself. Compared with the lighting effect that can only be shown at a target position by projection, the effect of stage light is increased, which makes the stage light itself has certain attraction. Moreover, the effect light source is used separately to render the light-transmitting plate, which is independent of the main light source, and can realize the independent control of the effect light source. When the main light source is off, the effect light source can be individually turned on to light up the second side of the light-transmitting plate with more obvious effect, and the decorative effect of the stage light itself is increased.

Further, at least one of the first surface and the second surface is frosted. By the surface frosting process, the light emitted by the effect light source is refracted and reflected after entering into the light-transmitting plate through the first side, so that the first surface and/or the second surface are illuminated. It is ensured that the light-transmitting plate can make full use of light, and the light emitted from the first surface and/or the second surface is reduced, and the brightness of the second side is increased.

Further, the light-transmitting plate has a thickness greater than or equal to 15% of a width of a light-emitting surface of the effect light source. Trying to improve the utilization of the effect light source to ensure luminous flux of the light emitted by the effect light source entering the light-transmitting plate can make the light-transmitting plate has sufficient brightness.

Further, the light-transmitting plate has a thickness ranging from 0.5 mm to 3 mm. This prevents a light path of the main light source from being blocked by the light-transmitting plate to appear obvious dark area of the projected light spot.

Further, the light emitted by the effect light source at least partially enters the first side vertically. This makes the light lose less when entering the first side, i.e. reducing the reflection of light, making it more enter the first side.

Further, the light-transmitting plate is parallel to the light path of the main light source. This prevents the light-transmitting plate from blocking the light emitted by the main light source from affecting the light effect. Since the light emitted by the main light source will pass through the light-transmitting plate, if the light-transmitting plate is an atomizer plate or a color plate, the light effect of the light emitted by the main light source will be atomized or changed color by the light-transmitting plate, causing unnecessary light effects.

Further, the light-transmitting plate is arranged side by side or radially distributed around a center of a light path, so that the second side of the light-transmitting plate can be arranged in corresponding shapes, the effect is gorgeous, and it is also easy to fix.

Further, the light-transmitting plate is distributed side by side at the light outlet, and both ends of the light-transmitting plate are connected to the lampshade.

Further, a central shaft is provided inside the lampshade, the light-transmitting plate is radially distributed around the central shaft, and the light-transmitting plate is connected to the lampshade at one end, and to the central shaft at the other end.

Further, the first side is a side of the light-transmitting plate close to a side wall of the lampshade, and the second side is a side of the light-transmitting plate away from the main light source. The second side is located at the side of light-transmitting plate away from the light source to ensure that a viewer can directly see the light emitted by the second side, and the first side is close to a side wall of the lampshade, so that the effect light source can be arranged at the side wall of the lampshade, which facilitates the installation of the effect light source.

Further, the light-transmitting plate is pivotally fixed and can be switched between a first state and a second state. When the light-transmitting plate is in the first state, the light-transmitting plate is parallel to the light path of the main light source. When the light-transmitting plate is in the second state, at least part of the light emitted by the main light source enters from the first surface and exits from the second surface. The light-transmitting plate can be rotated around a rotation axis, which can adjust the state according to different performance needs. When the light-transmitting plate is in the first state, the light-transmitting plate receives the light emitted by the effect light source to perform an additional visual effect. When the light-transmitting plate is in the second state, if the light-transmitting plate is an atomizer plate, the main light source can adjust the atomization effect through the light-transmitting plate; if the light-transmitting plate is a color plate, a local color of a projected spot can be changed.

Further, the rotation axis of the light-transmitting plate is perpendicular to the light path of the main light source. This saves the space occupied by the light-transmitting plate in a direction of the light path, and facilitates the installation of the light-transmitting plate.

Further, the effect light source is located on the rotation axis of the light-transmitting plate. During the rotation of the light-transmitting plate, the light emitted by the effect light source can always enter the light-transmitting plate, ensuring that the second side is continuously illuminated.

Further, the light-transmitting plate is pivotally connected at one end, and the effect light source is located at the other end of the light-transmitting plate on the rotation axis of the light-transmitting plate. This realizes that the effect light source is arranged on the rotation axis of the light-transmitting plate.

Further, the effect light source is a multi-color LED. The effect light source has multiple colors, so that the light-transmitting plate can realize multiple color transformations.

Further, the at least one effect light source includes a plurality of effect light sources, the at least one light-transmitting plate includes a plurality of light-transmitting plates, and each light-transmitting plate corresponds to at least one of the effect light sources. This makes the light received by the light-transmitting plate have sufficient brightness.

Further, the plurality of effect light sources are controlled independently of each other or controlled independently by groups. The effect light sources control independently of each other or control independently by groups, by a software, the color and switch state of the multi-color LED to produce the possibility of combining a variety of colors and light dynamic.

100: light-transmitting plate; 110: first side; 120: second side; 130: bulge; 140: elastomer; 200: effect light source; 300: lampshade; 400: main light source; 500: condensing lens; 510: light-exiting lens; 520: shading plate; 530: light guide; 600: central shaft; 610: axial column; 620: mounting clamp hole; 630: central shaft cover; 700: rotation shaft; 800: lever; 900: moving block; 910: pivot shaft.

DETAILED DESCRIPTION

The accompanying drawings are only for illustrative purposes and cannot be construed as limitations on the present invention. In order to better illustrate the embodiment, some parts of the accompanying drawings may be omitted, enlarged or shrunk, and do not represent the size of an actual product. For those skilled in the art, it is understandable that some well-known structures and their descriptions may be omitted in the accompanying drawings.

Figure 1:
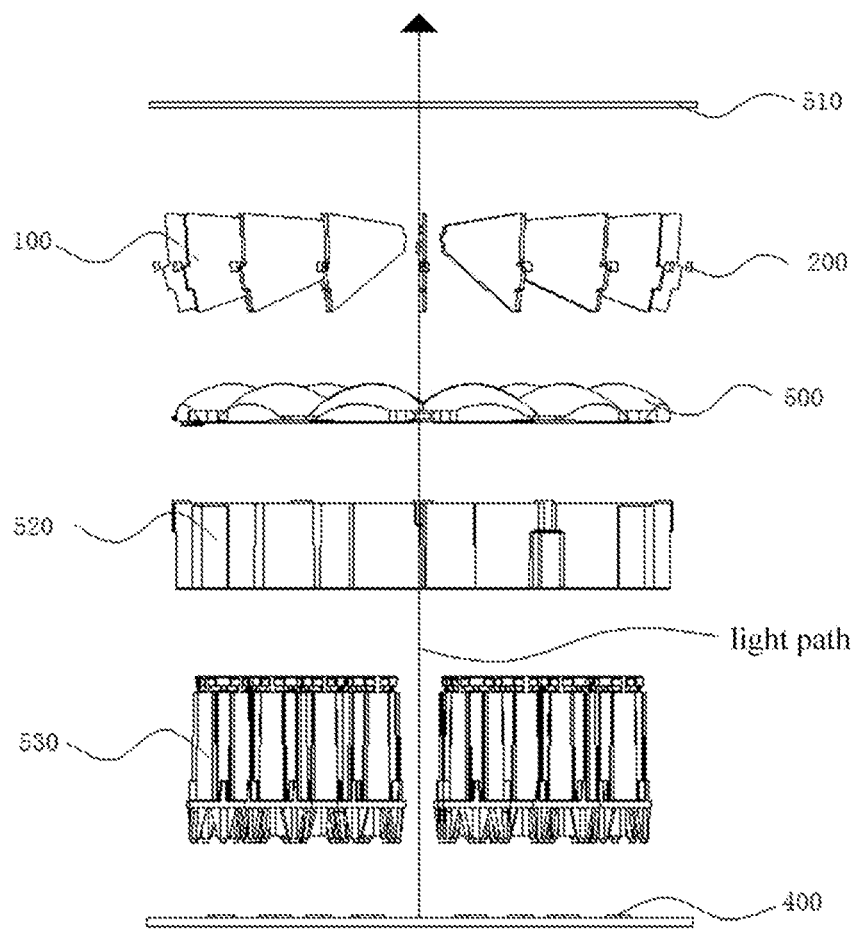
FIG. 1 is a diagram of a light path according to Embodiment 1 of the present invention.
Figure 2:
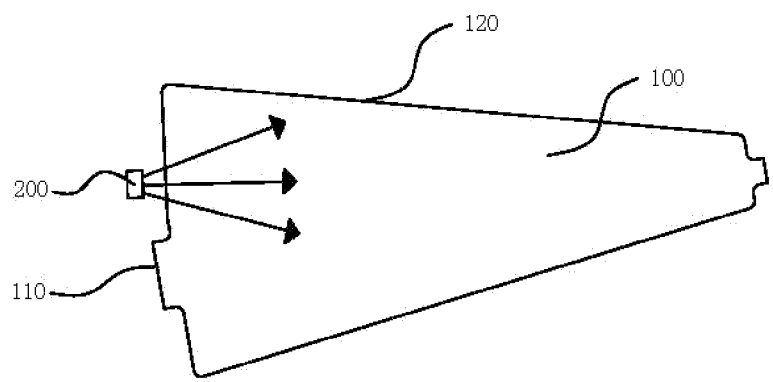
FIG. 2 is a schematic diagram of a cooperative structure effect of a light source and a light-transmitting plate according to the present invention.
Figure 3:
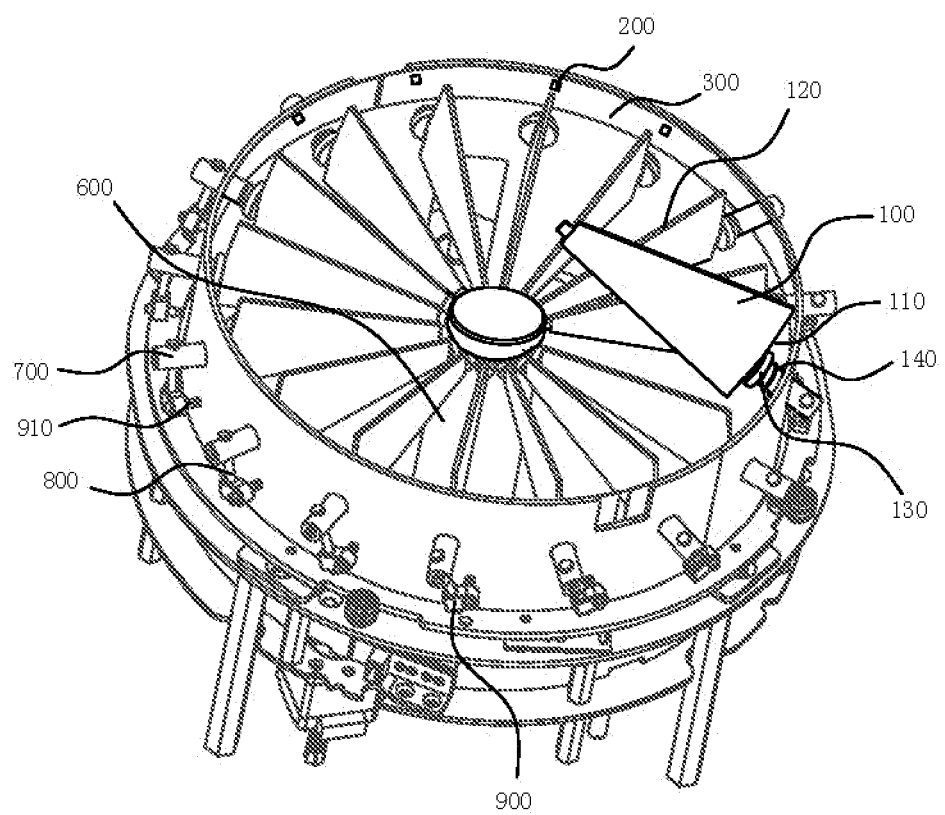
FIG. 3 is a schematic diagram of an overall structure of Embodiment 1 of the present invention.

Embodiment 1 of the present invention is shown in FIG. 1 to FIG. 3, which includes a main light source 400, and a lampshade 300. The main light source 400 is located at a bottom of the lampshade 300. It further includes effect light sources 200 and light-transmitting plates 100 which are located at a light outlet of the lampshade 300. The effect light source 200 and the main light source 400 are controlled independently of each other. The light-transmitting plate 100 has a first surface and a second surface, and a first side 110 and a second side 120 connecting the first surface and the second surface, respectively. At least part of the light emitted by the effect light source 200 enters from the first side 110 and exits from the second side 120.

At least part of the light emitted by the effect light source 200 enters from the first side 110 and exits from the second side 120, so that the second side 120 is illuminated, which decorates the stage light itself. Compared with the lighting effect that can only be shown at a target position by projection, the effect of stage light is increased, which makes the stage light itself has certain attraction. Moreover, the effect light source 200 is used separately to render the light-transmitting plate 100, which is independent of the main light source 400, and can realize the independent control of the effect light source 200. When the main light source 400 is off, the effect light source 200 can be individually turned on to light up the second side 120 of the light-transmitting plate 100 with more obvious effect, and the decorative effect of the stage light itself is increased.

As shown in FIG. 1, in a preferred embodiment of the present invention, the stage light is provided sequentially with the main light source 400, a light guide 530, a condensing lens 500, the light-transmitting plates 100 and a light-exiting lens 510 along an emission direction of the light source. A shading plate 520 is arranged between the main light source 400 and the condensing lens 500. The light guide 530 is arranged at intervals in the grating of the shading plate 520 to avoid cross light.

In the Embodiment of the present invention, at least one of the first surface and the second surface is frosted. By the surface frosting process, the light emitted by the effect light source 200 is refracted and reflected after entering into the light-transmitting plate 100 through the first side 110, so that the first surface and/or the second surface are illuminated. It is ensured that the light-transmitting plate 100 can make full use of light, and the light emitted from the first surface and/or the second surface is reduced, and the brightness of the second side 120 is increased. Both surfaces of the first surface and the second surface are frosted.

In a preferred embodiment of the present invention, the light-transmitting plate 100 has a thickness greater than or equal to 15% of a width of a light-emitting surface of the effect light source 200. Trying to improve the utilization of the effect light source 200 to ensure luminous flux of the light emitted by the effect light source 200 entering the light-transmitting plate 100 can make the light-transmitting plate 100 has sufficient brightness.

In a preferred embodiment of the present invention, the light-transmitting plate 100 has a thickness ranging from 0.5 mm to 3 mm. This prevents a light path of the main light source 400 from being blocked by the light-transmitting plate 100 to appear obvious dark area of the projected light spot. Preferably, the thickness of the light-transmitting plate 100 is 1.2 mm.

As shown in FIG. 2, in a preferred embodiment of the present invention, the light emitted by the effect light source 200 at least partially enters the first side 110 vertically. This makes the light lose less when entering the first side 110, i.e. reducing the reflection of light, making it more enter the first side 110. In the present embodiment, the effect light source 200 is facing the first side 110, so that as much light as possible enters the first side 110 vertically.

As shown in FIG. 1, in a preferred embodiment of the present invention, the light-transmitting plate 100 is parallel to the light path of the main light source 400. This prevents the light-transmitting plate 100 from blocking the light emitted by the main light source 400 from affecting the light effect. Since the light emitted by the main light source 400 will pass through the light-transmitting plate 100, if the light-transmitting plate 100 is an atomizer plate or a color plate, the light effect of the light emitted by the main light source 400 will be atomized or changed color by the light-transmitting plate 100, causing unnecessary light effects.

In a preferred embodiment of the present invention, the light-transmitting plates 100 are arranged side by side or radially distributed around a center of a light path, so that the second side 120 of the light-transmitting plate 100 can be arranged in corresponding shapes, the effect is gorgeous, and it is also easy to fix. In other embodiments, the light-transmitting plates 100 may also be arranged in other shapes, such as a five-pointed star, a triangle, or a quincunx, to show additional effects.

As shown in FIG. 1 and FIG. 3, a central shaft 600 is arranged inside the lampshade 300, the light-transmitting plates 100 are radially distributed around the central shaft 600, and the light-transmitting plates 100 are connected to the lampshade 300 at one end, and to the central shaft 600 at the other end. When the lampshade 300 is circular, this way is preferred. Alternatively, the central shaft 600 and the lampshade 300 are coaxially arranged, wherein the central shaft 600 may be hollow or solid.

Optionally, the light-transmitting plates 100 are distributed side by side at the light outlet, and both ends of the light-transmitting plate 100 are connected to the lampshade 300. No additional fixing element is required, and this way is preferred when the lampshade 300 is square.

In a preferred embodiment of the present invention, the first side 110 is a side of the light-transmitting plate 100 close to a side wall of the lampshade 300, and the second side 120 is a side of the light-transmitting plate 100 away from the main light source 400. The second side 120 is located at the side of light-transmitting plate 100 away from the light source to ensure that a viewer can directly see the light emitted by the second side 120, and the first side 110 is close to a side wall of the lampshade 300, so that the effect light source 200 can be arranged at the side wall of the lampshade 300, which facilitates the installation of the effect light source 200. In other embodiments, the first side 110 and the second side 120 may also be located in other positions of the light-transmitting plate 100.

As shown in FIG. 3, in a preferred embodiment of the present invention, the light-transmitting plate 100 is pivotally fixed and can be switched between a first state and a second state. When the light-transmitting plate 100 is in the first state, the light-transmitting plate 100 is parallel to the light path of the main light source 400. When the light-transmitting plate 100 is in the second state, at least part of the light emitted by the main light source 400 enters from the first surface and exits from the second surface. The light-transmitting plate 100 can be rotated around a rotation axis, which can adjust the state according to different performance needs. When the light-transmitting plate 100 is in the first state, the light-transmitting plate 100 receives the light emitted by the effect light source 200 to perform an additional visual effect. When the light-transmitting plate 100 is in the second state, if the light-transmitting plate 100 is an atomizer plate, the main light source 400 can adjust the atomization effect through the light-transmitting plate 100; if the light-transmitting plate 100 is a color plate, a local color of a projected spot can be changed.

In the present embodiment, the light-transmitting plates 100 are radially distributed around a central axis of the light path, the central shaft 600 is arranged inside the lampshade 300, the light-transmitting plate 100 is connect to the central shaft 600 at one end, and to a rotation shaft 700 at the other end. The side wall of the lampshade 300 is provided with a through hole, and the rotation shaft 700 penetrates the through hole located at the side wall of the lampshade 300 and is fixedly connected to the lever 800. The lever 800 is slidably connected to the moving block 900. The moving block 900 is pivotally connected to a pivot shaft 910. The pivot shaft 910 is driven by a driving mechanism to move in a circumferential direction of the lampshade 300. Therefore, the pivot shaft 910 drives the moving block 900 to move, and since the lever 800 is slidably connected to the moving block 900, both the moving block 900 and the lever 800 will rotate. As a result, the lever 800 drives the rotation shaft 700 to perform a rotational movement to realize the rotation of the light-transmitting plate 100.

Optionally, the rotation shaft 700 has a bulge 130 at one end close to the light-transmitting plate 100, an elastomer 140 is sleeved on the rotation shaft 700, and one end abuts the bulge 130, and the other end abuts the side wall of the lampshade 300. As a result, the light-transmitting plate 100 can be installed and fixed, and the elastomer 140 can be compressed to make room for the installation of the other end of the light-transmitting plate 100.

In a preferred embodiment of the present invention, the rotation axis of the light-transmitting plate 100 is perpendicular to the light path of the main light source 400. This saves the space occupied by the light-transmitting plate 100 in a direction of the light path, and facilitates the installation of the light-transmitting plate 100.

In a preferred embodiment of the present invention, the effect light source 200 is a multi-color LED. The effect light source 200 has multiple colors, so that the light-transmitting plate 100 can realize multiple color transformations. The effect light source 200 has three colors of red, green and blue.

As shown in FIG. 1 to FIG. 3, in a preferred embodiment of the present invention, the number of the effect light source 200 and the number of the light-transmitting plate 100 are multiple, and each light-transmitting plate 100 corresponds to at least one of the effect light sources 200. This makes the light received by the light-transmitting plate 100 have sufficient brightness. In the present embodiment, there are 16 light-transmitting plates 100 and 16 effect light sources 200, and each light-transmitting plate 100 corresponds to one effect light source 200.

In a preferred embodiment of the present invention, the plurality of the effect light source 200 are controlled independently of each other or controlled independently by groups. The effect light sources 200 control independently of each other or control independently by groups, by a software, the color and switch state of the multi-color LED to produce the possibility of combining a variety of colors and light dynamic.

Optionally, in the 16 effect light source 200, the effect light source 200 corresponding to one light-transmitting plate 100 is regarded as a group, so that the effect light sources 200 are divided into 16 groups, and the 16 groups of the effect light sources 200 are independently controlled by software.

Optionally, in the 16 effect light source 200, the effect light source 200 corresponding to four light-transmitting plate 100 is regarded as a group, so that the effect light sources 200 corresponding to 16 light-transmitting plates are divided into 4 group, and the 4 groups of the effect light sources 200 are independently controlled by software.

Figure 4:
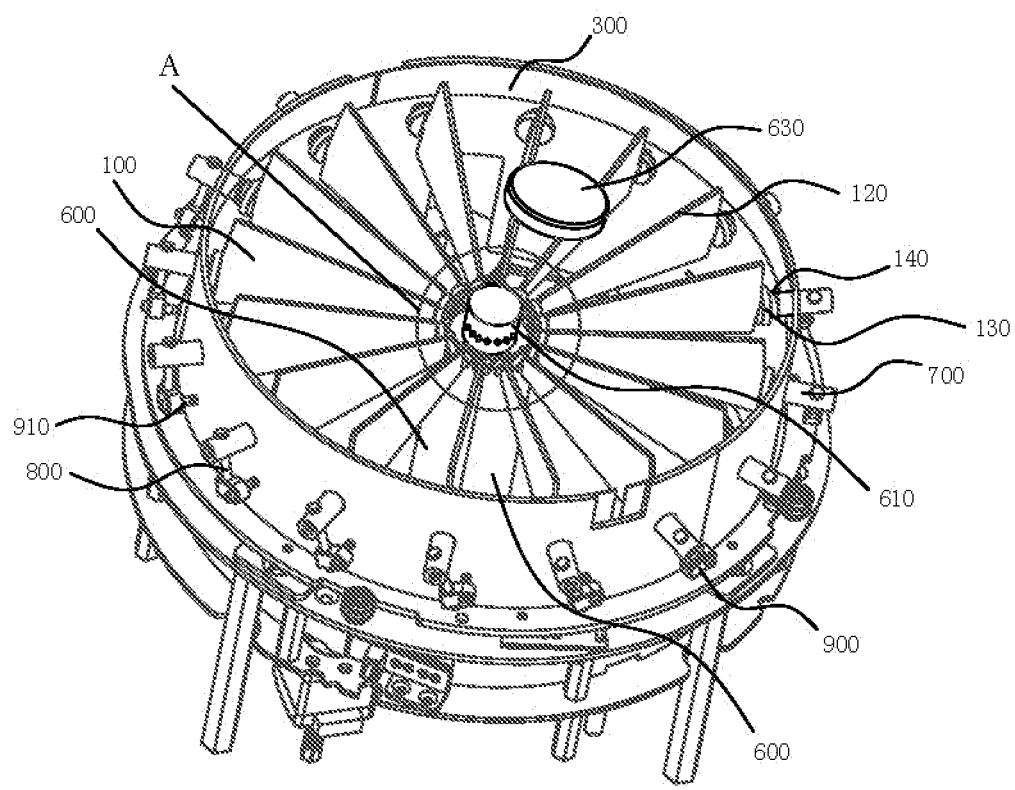
FIG. 4 is a schematic diagram of an overall structure of Embodiment 2 of the present invention.
Figure 5:
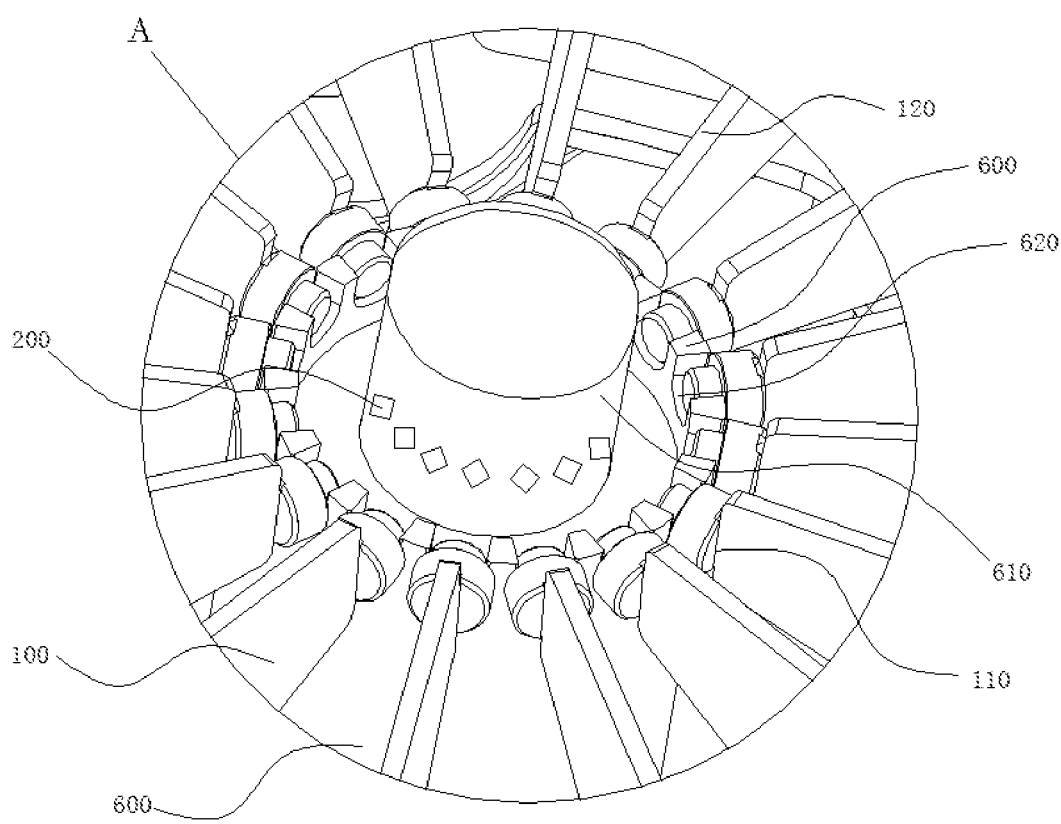
FIG. 5 is a partial enlarged view of part A in FIG. 4.

Embodiment 2 of the present invention is shown in FIG. 4 to FIG. 5. The effect light source 200 is located on the rotation axis of the light-transmitting plate 100. During the rotation of the light-transmitting plate 100, the light emitted by the effect light source 200 can always enter the light-transmitting plate 100, ensuring that the second side 120 is continuously illuminated.

In the Embodiment 2, the light-transmitting plate 100 is pivotally connected at one end, and the effect light source 200 is located at the other end of the light-transmitting plate 100 on the rotation axis of the light-transmitting plate 100. This realizes that the effect light source 200 is arranged on the rotation axis of the light-transmitting plate 100. In the present embodiment, a axial column 610 is arranged inside the central shaft 600, and the axial column 610 is coaxially arranged with the central shaft 600. The 16 effect light sources 200 are evenly distributed on the axial column 610. The central shaft 600 is provided with a mounting clamp hole 620. The light-transmitting plate 100 is pivotally connected to the lampshade 300 at one end close to the lampshade 300, and is connected to the mounting clamp hole 620 at the other end, and both ends are aligned with one of the effect light sources 200 arranged on the axial column 610. A central shaft cover 630 is arranged on and covers the central shaft 600, and cooperates with the mounting clamp hole 620 to limit the light-transmitting plate 100. The central shaft cover 630 can be connected to the central shaft 600 by screws.

Obviously, the above-mentioned embodiments of the present invention are only examples to clearly illustrate the present invention, and are not intended to limit the implementation of the present invention. Any modification, equivalent replacement and improvement made within the spirit and principle of the present invention shall be included in the scope of protection claimed by the present invention.

What is claimed is:

1. A stage light with an additional visual effect comprising: a main light source for emitting a light path and a lampshade, the main light source located at a bottom of the lampshade, at least one effect light source and at least one light-transmitting plate located at a light outlet of the lampshade; the effect light source and the main light source are controlled independently of each other, the light-transmitting plate has a first surface and a second surface, and a first side and a second side connecting the first surface and the second surface, respectively, and at least part of the light emitted by the effect light source enters from the first side and exits from the second side;

wherein the light-transmitting plate is pivotally fixed and can be switched between a first state and a second state; when the light-transmitting plate is in the first state, the light-transmitting plate is parallel to the light path of the main light source; and when the light-transmitting plate is in the second state, at least part of the light emitted by the main light source enters from the first surface and exits from the second surface;

wherein an intersection angle between a rotation axis of the light-transmitting plate and the light path of the main light source is larger than 0°.

2. The stage light with the additional visual effect according to claim 1, wherein the light-transmitting plate has a thickness greater than or equal to 15% of a width of a light-emitting surface of the effect light source.

3. The stage light with the additional visual effect according to claim 1, wherein the light-transmitting plate has a thickness ranging from 0.5 mm to 3 mm.

4. The stage light with the additional visual effect according to claim 1, wherein the light emitted by the effect light source at least partially enters the first side vertically.

5. The stage light with the additional visual effect according to claim 1, wherein the light-transmitting plate is parallel to a light path of the main light source.

6. The stage light with the additional visual effect according to claim 1, wherein the light-transmitting plate is arranged side by side or radially distributed around a center of a light path.

7. The stage light with the additional visual effect according to claim 1, wherein the first side is a side of the light-transmitting plate close to a side wall of the lampshade, and the second side is a side of the light-transmitting plate away from the main light source.

8. The stage light with the additional visual effect according to claim 1, wherein a rotation axis of the light-transmitting plate is perpendicular to the light path of the main light source.

9. The stage light with the additional visual effect according to claim 1, wherein the effect light source is located on or above a rotation axis of the light-transmitting plate.

10. The stage light with the additional visual effect according to claim 1, wherein the effect light source is a multi-color LED.

11. The stage light with the additional visual effect according to claim 1, wherein the at least one effect light source comprises a plurality of effect light sources, the at least one light-transmitting plate comprises a plurality of light-transmitting plates, and each light-transmitting plate corresponds to at least one of the effect light sources.

12. The stage light with the additional visual effect according to claim 1, wherein at least one of the first surface and the second surface is frosted.

13. The stage light with the additional visual effect according to claim 6, wherein the light-transmitting plate is distributed side by side at the light outlet, and both ends of the light-transmitting plate are connected to the lampshade.

14. The stage light with the additional visual effect according to claim 6, wherein a central shaft is provided inside the lampshade, the light-transmitting plate is radially distributed around the central shaft, and the light-transmitting plate is connected to the lampshade at one end, and to the central shaft at the other end.

15. The stage light with the additional visual effect according to claim 9, wherein the light-transmitting plate is pivotally connected at one end, and the effect light source is located at the other end of the light-transmitting plate on the rotation axis of the light-transmitting plate.

16. The stage light with the additional visual effect according to claim 9, wherein the effect light sources are radially distributed around a central axis of the light path.

17. The stage light with the additional visual effect according to claim 11, wherein the plurality of effect light sources are controlled independently of each other or controlled independently by groups.

* * * * *